US012669895B2

(12) United States Patent
Suzuki

(10) Patent No.: US 12,669,895 B2
(45) Date of Patent: Jun. 30, 2026

(54) INFORMATION PROCESSING APPARATUS, NON-TRANSITORY COMPUTER READABLE MEDIUM, AND INFORMATION PROCESSING METHOD

(71) Applicant: FUJIFILM Business Innovation Corp., Tokyo (JP)

(72) Inventor: Takayoshi Suzuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/177,242

(22) Filed: Mar. 2, 2023

(65) Prior Publication Data

US 2024/0103666 A1 Mar. 28, 2024

(30) Foreign Application Priority Data

Sep. 22, 2022 (JP) ................................. 2022-151754

(51) Int. Cl.
*G06F 3/041* (2006.01)
*G06F 3/044* (2006.01)
(52) U.S. Cl.
CPC ............ *G06F 3/0418* (2013.01); *G06F 3/044* (2013.01)
(58) Field of Classification Search
None
See application file for complete search history.

(56) References Cited

U.S. PATENT DOCUMENTS

2015/0036180 A1* 2/2015 Naruse ................. G06K 15/005
358/1.15
2017/0017344 A1* 1/2017 Kuribayashi ....... G06F 3/04842
2017/0071678 A1 3/2017 Uchida et al.

FOREIGN PATENT DOCUMENTS

JP 2013-130912 A 7/2013
WO 2012/093619 A1 7/2012
WO 2016/098743 A1 6/2016

OTHER PUBLICATIONS

Apr. 14, 2026 Office Action issued in Japanese Patent Application No. 2022-151754.

* cited by examiner

*Primary Examiner* — Nicholas J Lee
(74) *Attorney, Agent, or Firm* — Oliff PLC

(57) ABSTRACT

An information processing apparatus includes a processor configured to: detect an operation position at which an operation of an operation panel based on an electrostatic capacitance method is performed; and in response to a predetermined condition being satisfied, execute calibration of the operation panel, the predetermined condition specifying occurrence of a shift between the operation position at which the operation is actually performed and a detection position at which the operation position is detected.

10 Claims, 11 Drawing Sheets

Figure 7:
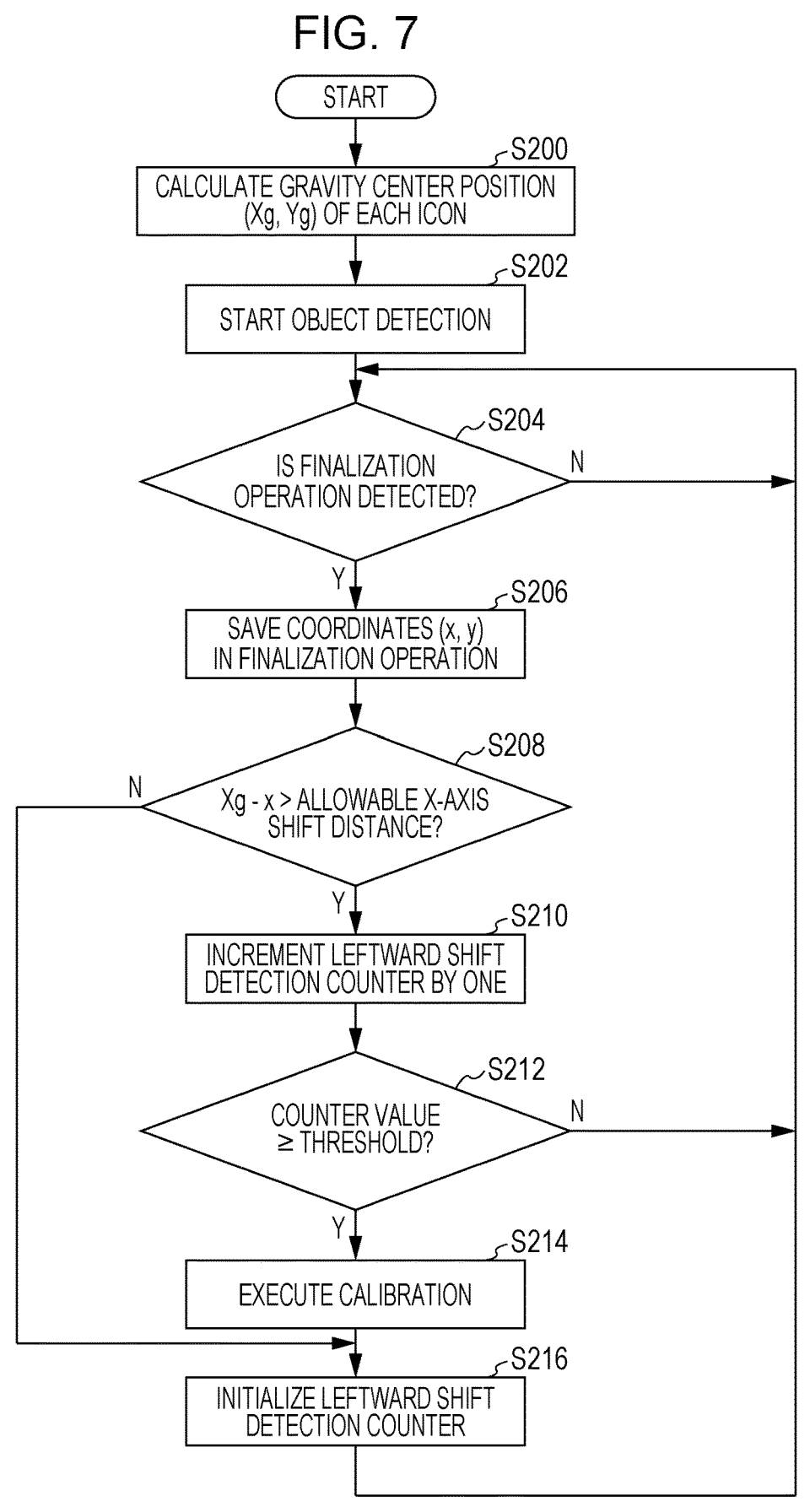

START

S200
CALCULATE GRAVITY CENTER POSITION
(Xg, Yg) OF EACH ICON

S202
START OBJECT DETECTION

S204
IS FINALIZATION
OPERATION DETECTED?    N

Y

S206
SAVE COORDINATES (x, y)
IN FINALIZATION OPERATION

S208
N    Xg - x > ALLOWABLE X-AXIS
SHIFT DISTANCE?

Y

S210
INCREMENT LEFTWARD SHIFT
DETECTION COUNTER BY ONE

S212
COUNTER VALUE
≥ THRESHOLD?    N

Y

S214
EXECUTE CALIBRATION

S216
INITIALIZE LEFTWARD SHIFT
DETECTION COUNTER

30

INFORMATION PROCESSING APPARATUS, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2022-151754 filed Sep. 22, 2022.

BACKGROUND

(i) Technical Field

The present disclosure relates to an information processing apparatus, a non-transitory computer readable medium, and an information processing method.

(ii) Related Art

Japanese Unexamined Patent Application Publication No. 2013-130912 proposes an image forming apparatus including a human sensor and calibration execution unit. The human sensor detects the presence of an object in a predetermined distance from a touch panel. The calibration execution unit generates contactless state data by calibrating the touch panel and writes the contactless state data as data for correction to a correction data memory.

SUMMARY

The magnetic field of an electrostatic capacitive operation panel is changed due to an object disposed nearby the operation panel. In addition, the characteristics of the operation panel are changed over time in some cases. The changes sometimes cause a shift between the actual operation position at which a user operates the operation panel and a detection position at which the operation panel detects an operation position, and thus calibration is required to be executed regularly. However, the calibration executed as in the related art when an object such as a finger is absent near the operation panel or highly likely to be absent is likely to be the calibration executed when the calibration is not originally required. In addition, since the operation position is not detected during the calibration, time during which the operation position is not detected is increased as the number of calibration times increases.

Aspects of non-limiting embodiments of the present disclosure relate to providing an information processing apparatus, a non-transitory computer readable medium, and an information processing method that are enabled to execute calibration at timing when the calibration of the electrostatic capacitive operation panel is required.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: detect an operation position at which an operation of an operation panel based on an electrostatic capacitance method is performed; and in response to a predetermined condition being satisfied, execute calibration of the operation panel, the predetermined condition specifying occurrence of a shift between the operation position at which the operation is actually performed and a detection position at which the operation position is detected.

BRIEF DESCRIPTION OF THE DRAWINGS

Exemplary embodiments of the present disclosure will be described in detail based on the following figures, wherein:

FIG. 7 is a flowchart illustrating an example of the flow of processing performed by the information processing apparatus according to a second exemplary embodiment;

DETAILED DESCRIPTION

Figure 1:
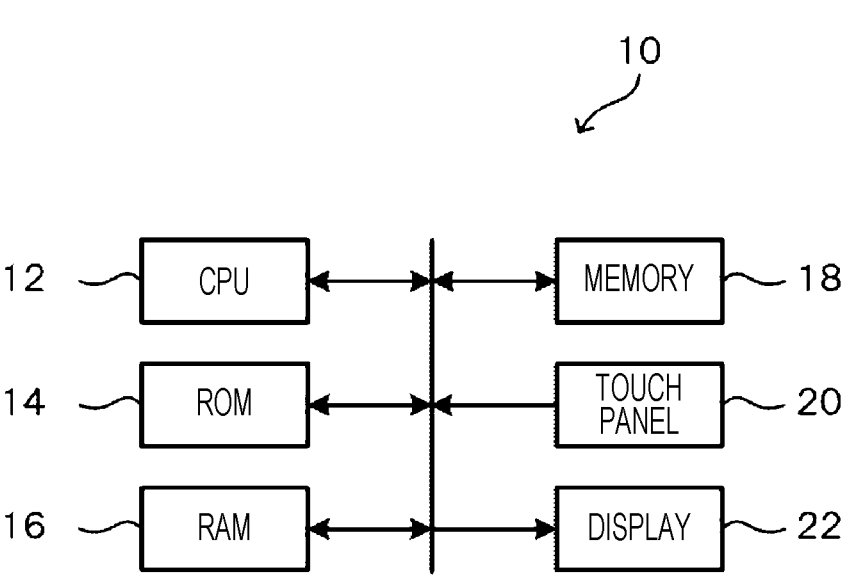
FIG. 1 is a view illustrating the schematic configuration of an information processing apparatus according to exemplary embodiments.

Hereinafter, examples of exemplary embodiments of the present disclosure will be described in detail with reference to the drawings. FIG. 1 is a view illustrating the schematic configuration of an information processing apparatus according to each exemplary embodiment.

As illustrated in FIG. 1, an information processing apparatus 10 according to the exemplary embodiment includes a central processing unit (CPU) 12, a read only memory (ROM) 14, a random access memory (RAM) 16, a memory 18, a touch panel 20 as an example of an operation panel, and a display 22.

The CPU 12 performs overall operations of the information processing apparatus 10. The ROM 14 stores various control programs, various parameters, and the like in advance. The RAM 16 is used as a work area or the like in running the various programs by the CPU 12. The memory 18 stores various pieces of data, application programs, and the like. For example, the memory 18 applies to a flash memory.

The touch panel 20 is used to input various pieces of information. In the exemplary embodiment, the touch panel 20 applies to an electrostatic capacitive touch panel, and a contact operation and a non-contact operation are available. In addition, in the exemplary embodiment, the touch panel 20 receives a non-contact operation in a non-contact mode and a contact operation in a normal mode. The following description assumes that the touch panel 20 is operated with a finger but may be operated with a target such as a pen other than the finger.

The display 22 is used to display various pieces of information and applies to, for example, a liquid crystal panel.

The components above are electrically connected to each other via a system bus. In the exemplary embodiment, the memory 18 applies to a flash memory as a memory; however, the application is not limited to this. The memory 18 may apply to another nonvolatile memory such as a hard disk drive (HDD).

The information processing apparatus 10 is installed in, for example, an image forming apparatus having multiple functions and operates the image forming apparatus. Examples of the multiple functions of the image forming apparatus include an image forming function of receiving various pieces of data and performing image forming processing based on the received data, a reading function of reading a document and then acquiring image information representing the document, a copying function of copying, onto a sheet, an image recorded on the document, a faxing function of transmitting and receiving various pieces of data via a telephone line (not illustrated), a transfer function of transferring document information such as the image information read by using the reading function or the like, an accumulation function of accumulating document information such as the read image information. The information processing apparatus 10 may be installed in another apparatus such as an image processing apparatus.

Meanwhile, a non-contact operation of the touch panel 20 is available in the information processing apparatus 10 according to this exemplary embodiment. However, if an object is disposed near the electrostatic capacitive touch panel 20 of which the non-contact operation is available, a magnetic field near the touch panel 20 is changed. In addition, the characteristics of the touch panel 20 are changed over time in some cases. The changes sometimes cause a shift between an operation position at which a user operates the touch panel 20 and a detection position at which the operation position is detected on the touch panel 20, and thus calibration is required to be executed regularly. The calibration function is a function of adjusting the detection position depending on the magnetic field near the non-contact panel, and the execution thereof is completed within one second. However, the position of the operation by the user is prevented from being detected during the calibration, and thus frequent execution deteriorates operability for the user.

Hence, the information processing apparatus 10 according to this exemplary embodiment is designed to execute the calibration of the touch panel 20 if a predetermined condition specifying the occurrence of a shift between the actual operation position and the detection position at which the operation position of the touch panel 20 is detected. In the calibration of the touch panel 20, for example, processing for calculating a correction value is performed to result in uniform detection values for the overall touch panel 20 in a state where an object is not detected.

The calibration may be executed immediately after the predetermined condition is fulfilled, after a predetermined fixed time has elapsed since the predetermined condition is fulfilled, or when the finger moves out of the detection area after the predetermined condition is fulfilled.

First Exemplary Embodiment

In this exemplary embodiment, if a finger as an example of a target is present in the detection area of the touch panel 20, and if a finalization operation is absent for a predetermined fixed time, the calibration is executed. The presence of the finger and the absence of the finalization operation serve as the predetermined condition.

Figure 2:
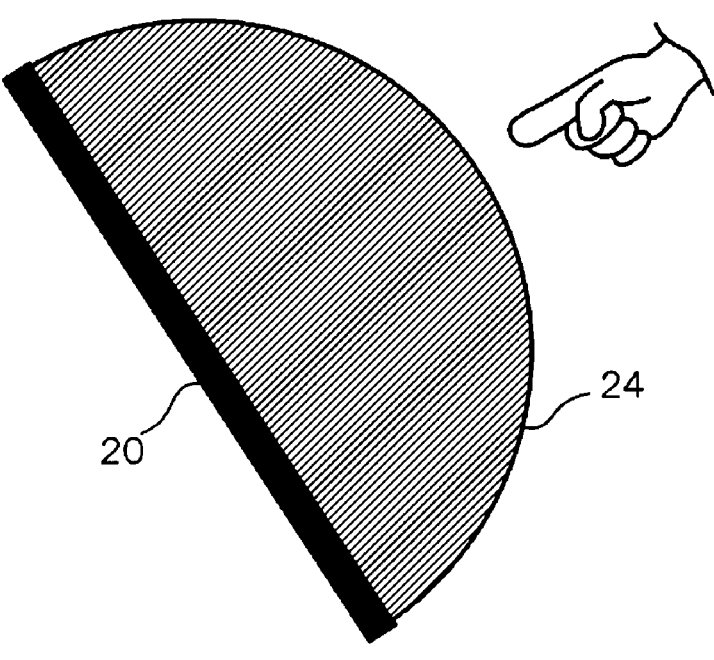
FIG. 2 is a view illustrating an example of the detection area of a touch panel.
Figure 3:
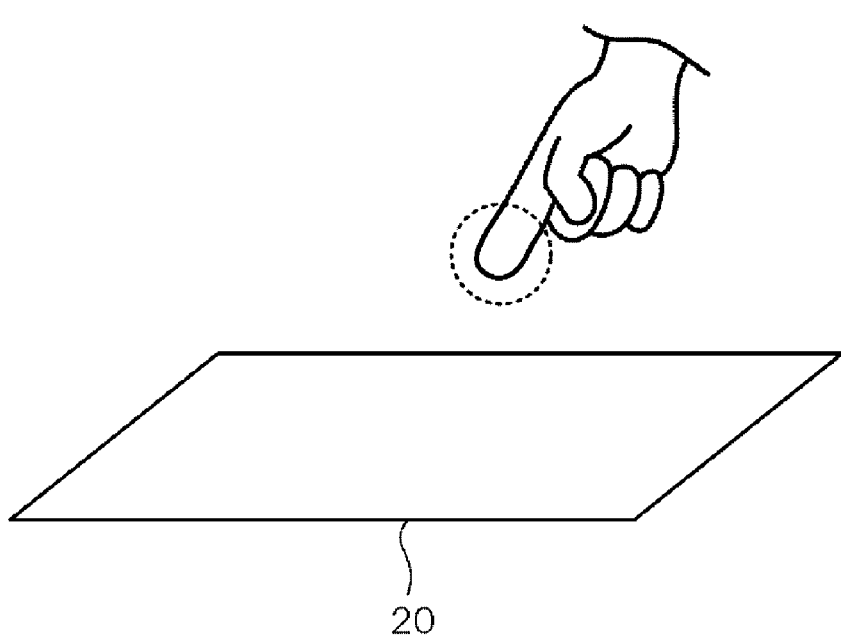
FIG. 3 is a view for explaining holding.

As illustrated in FIG. 2, the electrostatic capacitive touch panel 20 has a detection area 24 where a finger is detectable. If the finger is present in the detection area 24, and if the finalization operation that is holding is absent for the predetermined fixed time, it is determined that the detection position of the touch panel 20 (such as fluctuation of detection coordinates) is unstable, and thus the calibration is executed. Note that the detection area 24 is hemispherical in FIG. 2; however, the detection area is not limited to the hemisphere. The term "holding" denotes an operation for keeping a finger above the fixed area for the predetermined fixed time as illustrated in FIG. 3.

Figure 4:
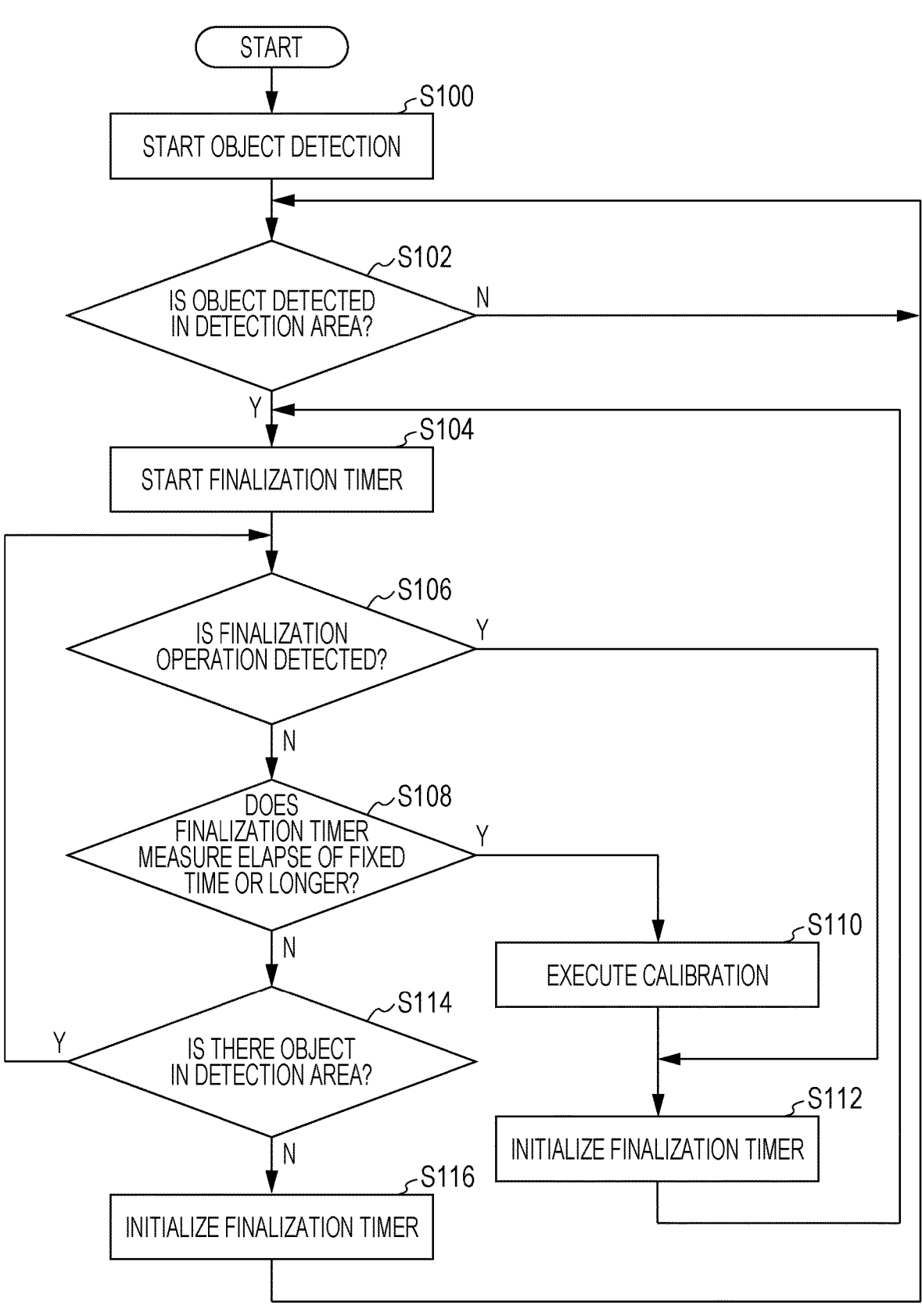
FIG. 4 is a flowchart illustrating an example of the flow of processing performed by the information processing apparatus according to a first exemplary embodiment.

Specific processing performed by the information processing apparatus 10 according to this exemplary embodiment will then be described. FIG. 4 is a flowchart illustrating an example of the flow of the processing performed by the information processing apparatus 10 according to this exemplary embodiment. For example, the processing in FIG. 4 is started if the information processing apparatus 10 is turned on and terminated if the information processing apparatus 10 is turned off. The processing in FIG. 4 is described on the assumption that the touch panel 20 is in the non-contact mode. The processing in FIG. 4 is described as an example where the calibration is executed immediately after the predetermined condition is fulfilled.

The CPU 12 starts object detection above the touch panel 20 in step S100 and then moves to step S102. In other words, the CPU 12 starts the detection of a finger above the touch panel 20.

In step S102, the CPU 12 determines whether an object is detected in the detection area 24. The CPU 12 waits until the determination result becomes affirmative. If the determination result becomes affirmative, the CPU 12 moves to step S104.

The CPU 12 starts a finalization timer in step S104 and then moves to step S106. The finalization timer is a timer for measuring time taken until the hold operation is detected.

In step S106, the CPU 12 determines whether the finalization operation is detected. In the determination, whether the hold operation is detected is determined. If the determination result is negative, the CPU 12 moves to step S108. If the determination result is affirmative, the CPU 12 moves to step S112 (described later).

In step S108, the CPU 12 determines whether the finalization timer measures the elapse of the predetermined fixed time or longer. If the determination result is affirmative, the CPU 12 moves to step S110. If the determination result is negative, the CPU 12 moves to step S114.

The CPU 12 executes the calibration of the touch panel 20 in step S110 and then moves to step S112.

The CPU 12 initializes the finalization timer in step S112, returns to step S104, and repeats the steps described above.

In contrast, in step S114, the CPU 12 determines whether there is an object in the detection area 24. If there is an object, the determination result becomes affirmative, and the CPU 12 returns to step S106 to repeat the steps described above. If there is not an object, the determination result becomes negative, and the CPU 12 moves to step S116.

The CPU 12 initializes the finalization timer in step S116, returns to step S102, and repeats the steps described above.

The processing performed in this manner causes the calibration to be executed if a finger is present in the detection area of the touch panel 20, and if the finalization operation is absent for the predetermined fixed time, and thus the detection position of the touch panel 20 becomes stable.

For the processing above in FIG. 4, the example in which the calibration is executed immediately after the predetermined condition is fulfilled as the calibration timing has been described. To execute the calibration after the predetermined fixed time has elapsed since the predetermined condition is fulfilled, a step for waiting for a fixed time may be added as a step before moving to step S110.

Figure 5:
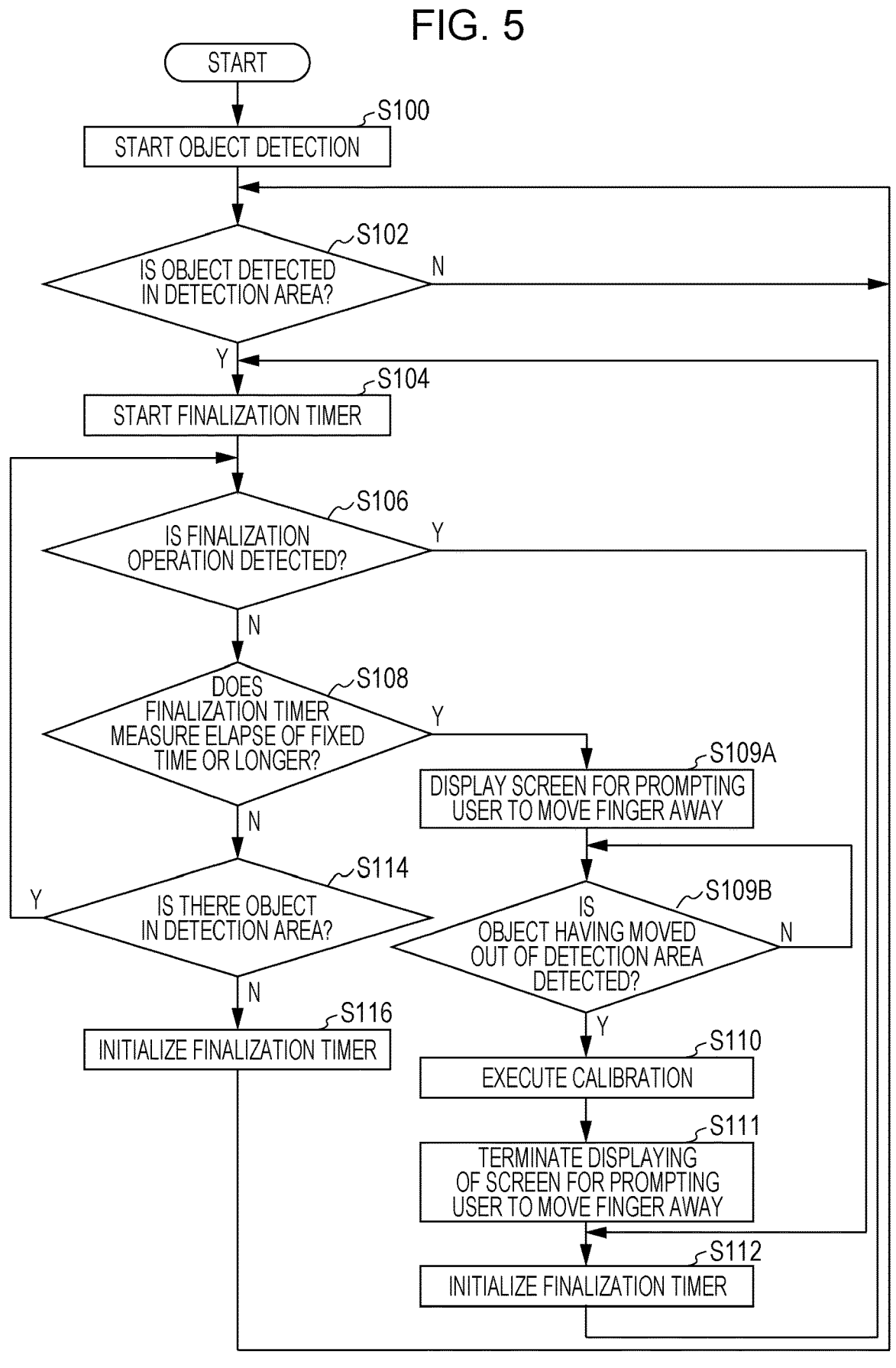
FIG. 5 is a flowchart illustrating another example of the flow of the processing performed by the information processing apparatus according to the first exemplary embodiment.

To execute the calibration if the finger moves out of the detection area 24 after the predetermined condition is fulfilled, as the calibration timing, the processing in FIG. 5 is performed. FIG. 5 is a flowchart illustrating another example of the flow of the processing performed by the information processing apparatus 10 according to this exemplary embodiment. For example, the processing in FIG. 5 is started if the information processing apparatus 10 is turned on and is terminated if the information processing apparatus 10 is turned off. The processing in FIG. 5 is described on the assumption that the touch panel 20 is in the non-contact mode. The processing in FIG. 5 is described as an example where the calibration is executed after the predetermined fixed time has elapsed since the predetermined condition is fulfilled. The same steps as those in the processing in FIG. 4 are denoted by the same reference numerals in the description.

The CPU 12 starts the object detection above the touch panel 20 in step S100 and then moves to step S102. In other words, the CPU 12 starts the detection of a finger above the touch panel 20.

In step S102, the CPU 12 determines whether an object is detected in the detection area 24. The CPU 12 waits until the determination result becomes affirmative. If the determination result becomes affirmative, the CPU 12 moves to step S104.

The CPU 12 starts the finalization timer in step S104 and then moves to step S106. The finalization timer is a timer for measuring time taken until the hold operation is detected.

In step S106, the CPU 12 determines whether the finalization operation is detected. In the determination, whether the hold operation is detected is determined. If the determination result is negative, the CPU 12 moves to step S108. If the determination result is affirmative, the CPU 12 moves to step S112 (described later).

In step S108, the CPU 12 determines whether the finalization timer measures the elapse of the predetermined fixed time or longer. If the determination result is affirmative, the CPU 12 moves to step S109A. If the determination result is negative, the CPU 12 moves to step S114.

The CPU 12 displays, on the display 22, a screen for prompting the user to move the finger away in step S109A and then moves to step S109B.

In step S109B, the CPU 12 determines whether the object having moved out of the detection area 24 is detected. The CPU 12 waits until the determination result becomes affirmative. If the determination result becomes affirmative, the CPU 12 moves to step S110.

The CPU 12 executes the calibration of the touch panel 20 in step S110 and then moves to step S111.

The CPU 12 terminates the displaying of the screen for prompting the user to move the finger away in step S111 and then moves to step S112. Note that steps S109A and S111 may be omitted, and the calibration may be executed if the object having moved out of the detection area 24 is detected.

The CPU 12 initializes the finalization timer in step S112, returns to step S104, and repeats the steps described above.

In contrast, in step S114, the CPU 12 determines whether there is an object in the detection area 24. If there is an object, the determination result becomes affirmative, and the CPU 12 returns to step S106 to repeat the steps described above. If there is not an object, the determination result becomes negative, and the CPU 12 moves to step S116.

The CPU 12 initializes the finalization timer in step S116, returns to step S102, and repeats the steps described above.

The processing performed in this manner causes the calibration to be executed if the finger is present in the detection area of the touch panel 20 and if the finger moves out of the detection area 24 after the absence of the finalization operation for the predetermined fixed time is detected, and thus the detection position of the touch panel 20 becomes stable.

Second Exemplary Embodiment

In this exemplary embodiment, the calibration is executed if a predetermined fixed distance or longer, in a specific direction that is one of up, down, right, and left directions, between the gravity center position of one of icons and the coordinates at the time of the finalization operation by the user is consecutively detected. The consecutive detections serve as the predetermined condition.

Figure 6:
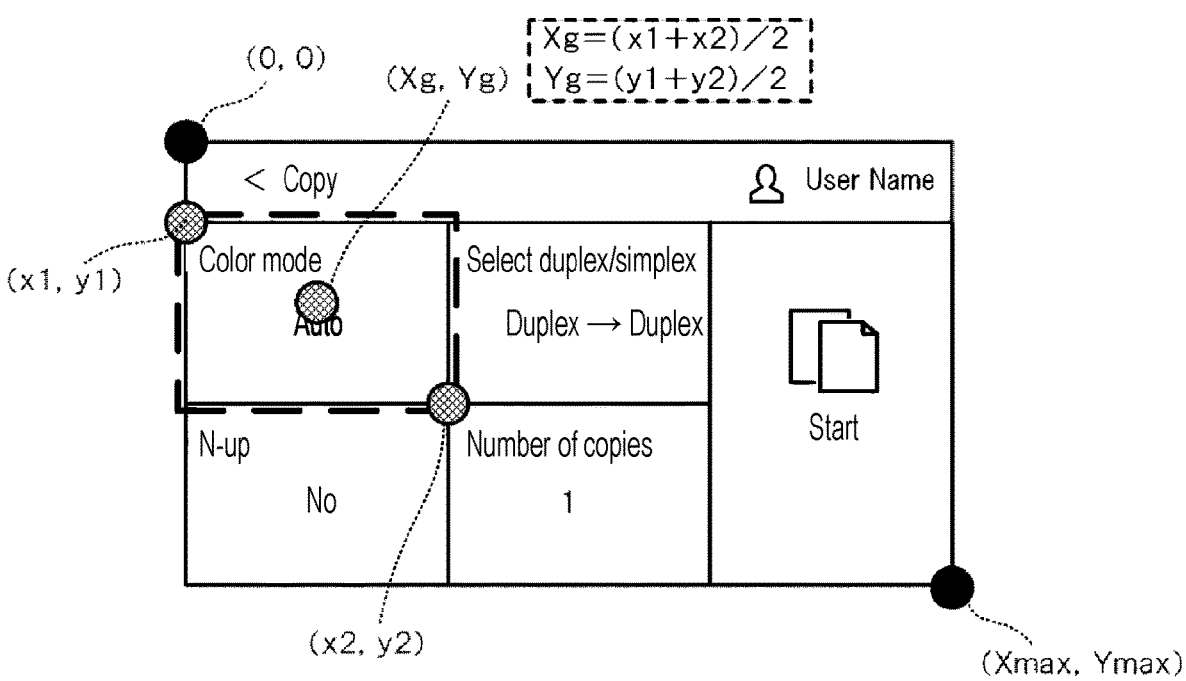
FIG. 6 is a view for explaining an example of calculating the gravity center position of one of icons.

Specifically, the gravity center position of one of the icons displayed on the display 22 is calculated. In the example in FIG. 6, the gravity center position of the icon (Xg, Yg) is calculated where the coordinates of each of diagonally facing points of the icon for selecting Color mode are (x1, y1) and (x2, y2). This case results in $Xg=(x1+x2)/2$ and $Yg=(y1+y2)/2)$. FIG. 6 is a view for explaining an example of calculating the gravity center position of the icon.

If the predetermined fixed distance or longer, in the specific direction that is one of the up, down, right, and left directions, between the calculated gravity center position of the icon (Xg, Yg) and the coordinates at the time of the finalization operation by the user is consecutively detected, it is determined that the detection position of the touch panel 20 is shifted from the operation position, and then the calibration is executed. The up and down directions correspond to the directions along the Y axis serving as the up and down directions in FIG. 6, and the right and left directions correspond to the directions along the X axis serving as the right and left directions in FIG. 6.

Note that if the fixed distances or longer in the specific direction in operations by not one user but multiple users are detected a predetermined number of times consecutively, it may be determined that the detection position of the touch panel 20 is shifted from the operation position. For example, suppose that the shifts are detected three times as the predetermined number of times consecutively. If the three-time operations are performed by one user, it may be determined that the predetermined condition is not satisfied. If the three-time operations are performed by multiple users, it may be determined that the predetermined condition is satisfied. Alternatively, if the three-time operations are performed by respective different users, it may be determined that the predetermined condition is satisfied.

The specific direction is not limited to the one of the up, down, right, and left directions and may include a direction other than the up, down, right, and left directions.

Specific processing performed by the information processing apparatus 10 according to this exemplary embodiment will be described. Hereinafter, an example where the calibration is executed if it is determined that a shift in the left direction as the specific direction occurs will be described. The same processing is performed on a shift in the right, up, or down direction, and thus the explanation of the processing performed in the determination of the shift in the right, up, or down direction is omitted.

FIG. 7 is a flowchart illustrating an example of the flow of the processing performed by the information processing apparatus 10 according to this exemplary embodiment. For example, the processing in FIG. 7 is started if the information processing apparatus 10 is turned on and is terminated if the information processing apparatus 10 is turned off. The processing in FIG. 7 is described on the assumption that the touch panel 20 is in the non-contact mode. The processing in FIG. 7 is described as an example where the calibration is executed immediately after the predetermined condition is fulfilled.

The CPU 12 calculates the gravity center position of each icon (Xg, Yg) displayed on the display 22 in step S200 and then moves to step S202.

The CPU 12 starts the object detection above the touch panel 20 in step S202 and then moves to step S204. In other words, the CPU 12 starts the detection of a finger above the touch panel 20.

In step S204, the CPU 12 determines whether the finalization operation is detected. In the determination, whether the hold operation is detected is determined. The CPU 12 waits until the determination result becomes affirmative. If the determination result becomes affirmative, the CPU 12 moves to step S206.

The CPU 12 saves the coordinates (x, y) at the time of the finalization operation in the memory 18 or the like in step S206 and then moves to step S208.

In step S208, the CPU 12 determines whether Xg−x is higher than an allowable shift distance in the X-axis direction. In the determination, the CPU 12 determines whether the distance of the shift in the left direction is the fixed distance or longer. If the determination result is affirmative, the CPU 12 moves to step S210. If the determination result is negative, the CPU 12 moves to step S216.

The CPU 12 increments the leftward shift detection counter by one in step S210 and then moves to step S212.

In step S212, the CPU 12 determines whether the counter value is higher than or equal to a predetermined threshold. In the determination, for example, three times is applied to the threshold and it is determined that whether the shift distance exceeds allowable value three times consecutively. If the determination result is affirmative, the CPU 12 moves to step S214. If the determination result is negative, the CPU 12 returns to step S204 and repeats the steps described above.

The CPU 12 executes the calibration of the touch panel 20 in step S214 and then moves to step S216.

The CPU 12 initializes the leftward shift detection counter in step S216, returns to step S204, and repeats the steps described above.

The processing performed in this manner causes the calibration to be executed if the predetermined fixed distance or longer, in the specific direction, between the gravity center position of the icon and the coordinates at the time of the finalization operation by the user is detected consecutively, and thus the shift between the operation position and the detection position is prevented.

Although FIG. 7 illustrates the example where the calibration is executed immediately after the predetermined condition is fulfilled, the calibration may be executed like the first exemplary embodiment: after the predetermined fixed time has elapsed since the predetermined condition is fulfilled; or when the finger moves out of the detection area 24 after the predetermined condition is fulfilled.

Third Exemplary Embodiment

In this exemplary embodiment, the calibration is executed if an operation of a non-operation area is performed for a predetermined fixed time. The operation performed for the predetermined fixed time serves as the predetermined condition.

Figure 8:
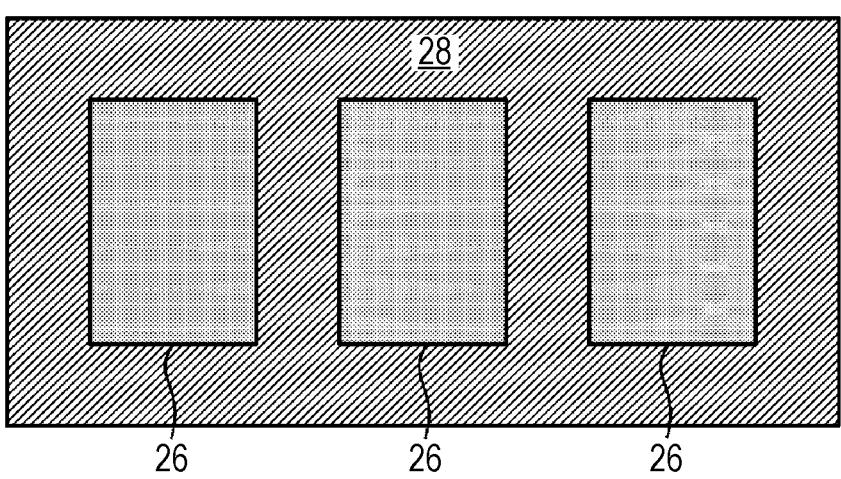
FIG. 8 is a view illustrating an example of an operation screen including the icons and the non-operation area except the icons.

Specifically, an operation screen as illustrated in FIG. 8 is displayed. If an operation of an non-operation area 28 that is an oblique-line part except icons 26 is performed for the predetermined fixed time is detected, it is determined that that the detection position of the touch panel is shifted from the operation position, and thus the calibration is executed. On the operation screen in FIG. 8, three squares represent the icons 26, and the oblique-line part as the area except the icons 26 represents the non-operation area 28.

Figure 9:
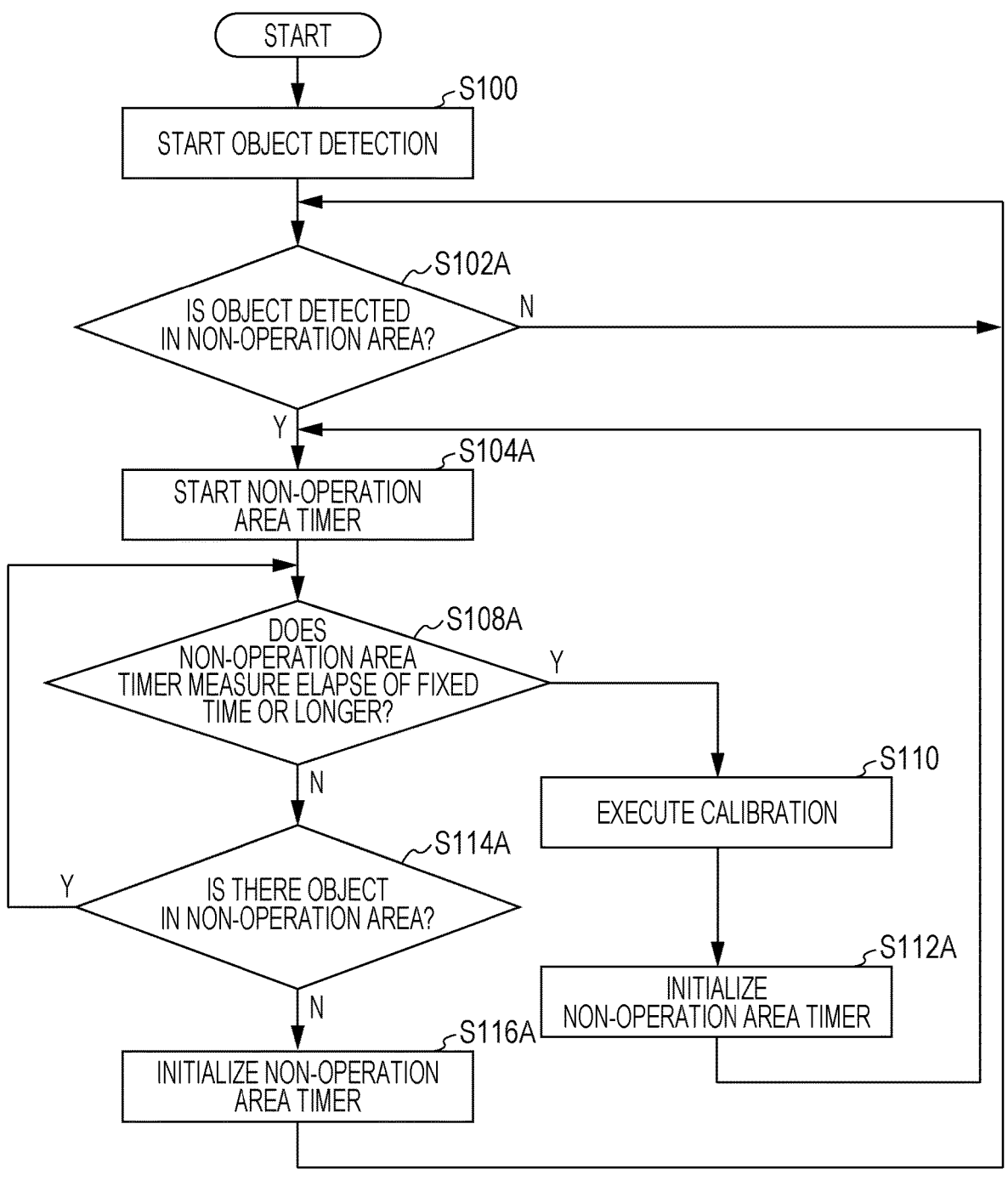
FIG. 9 is a flowchart illustrating an example of the flow of processing performed by the information processing apparatus according to a third exemplary embodiment.

Specific processing performed by the information processing apparatus 10 according to this exemplary embodiment will be described. FIG. 9 is a flowchart illustrating an example of the flow of the processing performed by the information processing apparatus 10 according to this exemplary embodiment. For example, the processing in FIG. 9 is started if the information processing apparatus 10 is turned on and is terminated if the information processing apparatus 10 is turned off. The processing in FIG. 9 is described on the assumption that the touch panel 20 is in the non-contact mode. The processing in FIG. 9 is described as an example where the calibration is executed immediately after the predetermined condition is fulfilled. The same steps as those in the processing in FIG. 4 are denoted by the same reference numerals in the description.

The CPU 12 starts the object detection above the touch panel 20 in step S100 and then moves to step S102A. In other words, the CPU 12 starts the detection of a finger above the touch panel.

In step S102A, the CPU 12 determines whether an object is detected in the non-operation area 28. The CPU 12 waits until the determination result becomes affirmative. If the determination result becomes affirmative, the CPU 12 moves to step S104A.

The CPU 12 starts the non-operation area timer in step S104A and then moves to step S108A. The non-operation area timer is a timer for measuring time in which the non-operation area is operated.

In step S108A, the CPU 12 determines whether the non-operation area timer measures the elapse of a predetermined fixed time or longer. If the determination result is affirmative, the CPU 12 moves to step S110. If the determination result is negative, the CPU 12 moves to step S114A.

The CPU 12 executes the calibration of the touch panel 20 in step S110 and then moves to step S112A.

The CPU 12 initializes the non-operation area timer in step S112A, returns to step S104A, and repeats the steps described above.

In contrast, in step S114A, the CPU 12 determines whether there is an object in the non-operation area 28. If there is an object, the determination result becomes affirmative, and the CPU 12 returns to step S108A to repeat the steps described above. If there is not an object, the determination result becomes negative, and the CPU 12 moves to step S116A.

The CPU 12 initializes the non-operation area timer in step S116A, returns to step S102A, and repeats the steps described above.

The processing performed in this manner causes the calibration to be executed if an operation of the non-operation area is performed for the predetermined fixed time, and thus the shift between the operation position and the detection position is prevented.

Although FIG. 9 illustrates the example where the calibration is executed immediately after the predetermined condition is fulfilled, the calibration may be executed like the first exemplary embodiment: after the predetermined fixed time has elapsed since the predetermined condition is fulfilled; or when the finger moves out of the detection area 24 after the predetermined condition is fulfilled.

Fourth Exemplary Embodiment

In some cases, an operation position of the non-contact touch panel 20 close to the outer edge of the screen causes the coordinates of the detection position to be closer to the coordinates of the outer edge during the operation than the coordinates of the operation position are.

Hence, in this exemplary embodiment, the calibration is executed if an operation of an area within a predetermined fixed distance from the outer edge of the touch panel 20 is performed for a predetermined fixed time or longer. The operation performed for the predetermined fixed time or longer serves as the predetermined condition.

Figure 10:
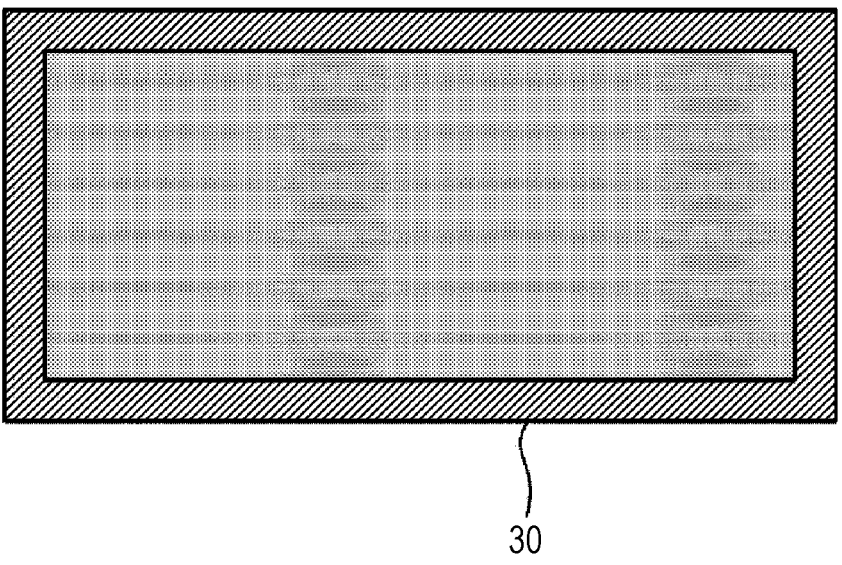
FIG. 10 is a view illustrating an example of an area a fixed distance away from the outer edge of a touch panel.

Specifically, the operation screen as illustrated in FIG. 10 is displayed. If an operation performed of an oblique-line part that is an area within a fixed distance from an outer edge 30 of the touch panel 20 for a fixed time is detected, it is determined that that the detection position of the touch panel 20 is shifted from the operation position, and thus the calibration is executed. On the operation screen in FIG. 10, the oblique-line part represents the area within the fixed distance from the outer edge 30 of the touch panel 20.

Figure 11:
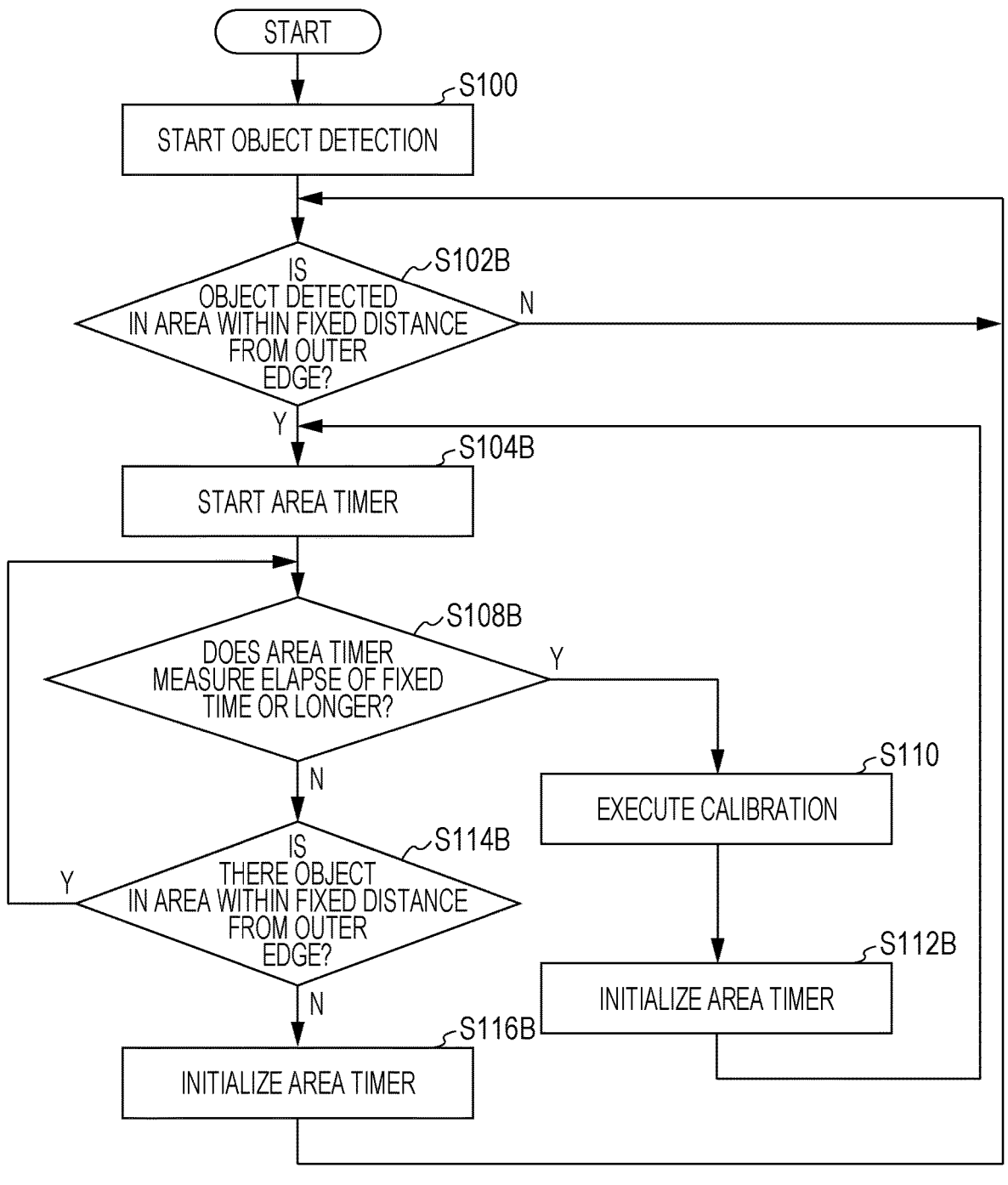
FIG. 11 is a flowchart illustrating an example of the flow of processing performed by the information processing apparatus according to a fourth exemplary embodiment.

Specific processing performed by the information processing apparatus 10 according to this exemplary embodiment will be described. FIG. 11 is a flowchart illustrating an example of the flow of the processing performed by the information processing apparatus 10 according to this exemplary embodiment. For example, the processing in FIG. 11 is started if the information processing apparatus 10 is turned on and is terminated if the information processing apparatus 10 is turned off. The processing in FIG. 11 is described on the assumption that the touch panel 20 is in the non-contact mode. The processing in FIG. 11 is described as an example where the calibration is executed immediately after the predetermined condition is fulfilled. The same steps as those in the processing in FIG. 4 are denoted by the same reference numerals in the description.

The CPU 12 starts the object detection above the touch panel 20 in step S100 and then moves to step S102B. In other words, the CPU 12 starts the detection of a finger above the touch panel 20.

In step S102B, the CPU 12 determines whether an object is detected in the area within the predetermined fixed distance from the outer edge 30 of the touch panel 20. The CPU 12 waits until the determination result becomes affirmative. If the determination result becomes affirmative, the CPU 12 moves to step S104B.

The CPU 12 starts an area timer in step S104B and then moves to step S108B. The area timer is a timer for measuring time in which an operation is performed of the area within the fixed distance from the outer edge 30 of the touch panel 20.

In step S108B, the CPU 12 determines whether the area timer measures the elapse of the predetermined fixed time or longer. If the determination result is affirmative, the CPU 12 moves to step S110. If the determination result is negative, the CPU 12 moves to step S114B.

The CPU 12 executes the calibration of the touch panel 20 in step S110 and then moves to step S112B.

The CPU 12 initializes the area timer in step S112B, returns to step S104B, and repeats the steps described above.

In contrast, in step S114B, the CPU 12 determines whether there is an object in the area within the fixed distance from the outer edge 30 of the touch panel 20. If there is an object, the determination result becomes affirmative, and the CPU 12 returns to step S108B to repeat the steps described above. If there is not an object, the determination result becomes negative, and the CPU 12 moves to step S116B.

The CPU 12 initializes the area timer in step S116B, returns to step S102B, and repeats the steps described above.

The processing performed in this manner causes the calibration to be executed if an operation is performed of the area within the predetermined fixed distance from the outer edge 30 of the touch panel 20 for the predetermined fixed time or longer, and thus the shift between the operation position and the detection position is prevented.

Although FIG. 11 illustrates the example where the calibration is executed immediately after the predetermined condition is fulfilled, the calibration may be executed like the first exemplary embodiment: after the predetermined fixed time has elapsed since the predetermined condition is fulfilled; or when the finger moves out of the detection area 24 after the predetermined condition is fulfilled.

The example of application of the operation panel allowing the contact operation and the non-contact operation has been described for the exemplary embodiments above; however, the present disclosure is not limited to this. Any operation panel allowing a non-contact operation may be applied. For example, an operation panel allowing only the non-contact operation may be applied.

In the embodiments above, the CPU has been described as an example of a processor; however, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The processing performed by the information processing apparatus 10 according to the exemplary embodiments may be performed by software, hardware, or combination of these. The processing performed by the information processing apparatus 10 may be distributed in such a manner as to be stored as a program in a storage medium.

The present disclosure is not limited to the exemplary embodiments described above. It goes without saying that the exemplary embodiments may be implemented in such a manner as not only described above but also to be modified variously without departing from the spirit of the disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing apparatus includes:
a processor configured to:
  detect an operation position at which an operation of an operation panel based on an electrostatic capacitance method is performed; and
  in response to a predetermined condition being satisfied, execute calibration of the operation panel, the predetermined condition specifying occurrence of a shift between the operation position at which the operation is actually performed and a detection position at which the operation position is detected.

(((2)))

In the information processing apparatus according to (((1))), the condition is satisfied in response to presence of a target within a predetermined detection area of the operation panel and absence of a predetermined finalization operation for a predetermined time.

(((3)))

In the information processing apparatus according to (((1))), the condition is satisfied in response to a predetermined distance or longer in a specific direction being detected a predetermined number of times or more consecutively, the predetermined distance or longer being between a coordinate at a time of the predetermined finalization operation by a user and a gravity center position of an icon.

(((4)))

In the information processing apparatus according to (((3))), the predetermined distance or longer is detected the predetermined number of times or more consecutively in response to multiple users performing the operations.

(((5)))

In the information processing apparatus according to (((1))), the condition is satisfied in response to detection of an operation of a predetermined non-operation area performed for a predetermined time or longer.

(((6)))

In the information processing apparatus according to (((1))), the condition is satisfied in response to detection of an operation of an area within a predetermined distance from an outer edge of the operation panel, the operation being performed for a predetermined time or longer.

(((7)))

In the information processing apparatus according to any one of (((1))) to (((6))), the processor is configured to: immediately after the condition is satisfied, after a predetermined time has elapsed since the condition is satisfied, or in response to detection of a target that has moved out of the detection area after the condition is satisfied, execute the calibration.

(((8)))

In the information processing apparatus according to (((7))), the processor is configured to: to execute the calibration in response to the detection of the target that has moved out of the detection area after the condition is satisfied, display a screen for prompting a user to move the target away in response to the condition being satisfied.

(((9)))

An information processing program causes a computer to execute a process for information processing, the process including:
  detecting an operation position at which an operation of an operation panel based on an electrostatic capacitance method is performed; and
  in response to a predetermined condition being satisfied, executing calibration of the operation panel, the predetermined condition specifying occurrence of a shift between the operation position at which the operation is actually performed and a detection position at which the operation position is detected.

What is claimed is:

1. An information processing apparatus comprising:
a processor configured to:
  detect an operation position at which an operation of an operation panel based on an electrostatic capacitance method is performed; and
  in response to a predetermined condition being satisfied, execute calibration of the operation panel, the predetermined condition specifying occurrence of a shift between the operation position at which the operation is actually performed and a detection position at which the operation position is detected,
  wherein the condition is satisfied in response to at least one of:
    presence of a target within a predetermined detection area of the operation panel and absence of a predetermined finalization operation for a predetermined time;
    a predetermined distance or longer in a specific direction being detected a predetermined number of times or more consecutively, the predetermined distance or longer being between a coordinate at a time of the predetermined finalization operation by a user and a gravity center position of an icon;
    detection of an operation of a predetermined non-operation area performed for a predetermined time or longer; and
    detection of an operation of an area within a predetermined distance from an outer edge of the operation panel, the operation being performed for a predetermined time or longer.

2. The information processing apparatus according to claim 1,
  wherein the condition is satisfied in response to the presence of the target within the predetermined detection area of the operation panel and the absence of the predetermined finalization operation for the predetermined time.

3. The information processing apparatus according to claim 1, wherein the condition is satisfied in response to the predetermined distance or longer in the specific direction being detected the predetermined number of times or more consecutively.

4. The information processing apparatus according to claim 3, wherein the predetermined distance or longer is detected the predetermined number of times or more consecutively in response to a plurality of the users performing a plurality of the operations.

5. The information processing apparatus according to claim 1, wherein the condition is satisfied in response to the detection of the operation of the predetermined non-operation area performed for the predetermined time or longer.

6. The information processing apparatus according to claim 1, wherein the condition is satisfied in response to the detection of the operation of an area within the predetermined distance from the outer edge of the operation panel.

7. The information processing apparatus according to claim 1, wherein the processor is configured to:

immediately after the condition is satisfied, after a predetermined time has elapsed since the condition is satisfied, or in response to detection of a target that has moved out of the detection area after the condition is satisfied, execute the calibration.

8. The information processing apparatus according to claim 7, wherein the processor is configured to:

to execute the calibration in response to the detection of the target that has moved out of the detection area after the condition is satisfied, display a screen for prompting a user to move the target away in response to the condition being satisfied.

9. A non-transitory computer readable medium storing a program causing a computer to execute a process for information processing, the process comprising:

detecting an operation position at which an operation of an operation panel based on an electrostatic capacitance method is performed; and in response to a predetermined condition being satisfied, executing calibration of the operation panel, the predetermined condition specifying occurrence of a shift between the operation position at which the operation is actually performed and a detection position at which the operation position is detected, wherein the condition is satisfied in a response to at least one of:

presence of a target within a predetermined detection area of the operation panel and absence of a predetermined finalization operation for a predetermined time;

a predetermined distance or longer in a specific direction being detected a predetermined number of times or more consecutively, the predetermined distance or longer being between a coordinate at a time of the predetermined finalization operation by a user and a gravity center position of an icon;

detection of an operation of a predetermined non-operation area performed for a predetermined time or longer; and detection of an operation of an area within a predetermined distance from an outer edge of the operation panel, the operation being performed for a predetermined time or longer.

10. An information processing method comprising:

detecting an operation position at which an operation of an operation panel based on an electrostatic capacitance method is performed; and in response to a predetermined condition being satisfied, executing calibration of the operation panel, the predetermined condition specifying occurrence of a shift between the operation position at which the operation is actually performed and a detection position at which the operation position is detected, wherein the condition is satisfied in response to at least one of:

presence of a target within a predetermined detection area of the operation panel and absence of a predetermined finalization operation or a predetermined time;

a predetermined distance or longer in a specific direction being detected a predetermined number of times or more consecutively, the predetermined distance or longer being between a coordinate at a time of the predetermined finalization operation by a user and a gravity center position of an icon;

detection of m operation of a predetermined non-operation area performed for a predetermined time or longer; and detection of an operation of an area within a predetermined distance from an outer edge of the operation panel, the operation being performed for a predetermined time or longer.

* * * * *